(12) United States Patent
Benayon et al.

(10) Patent No.: US 8,417,489 B2
(45) Date of Patent: Apr. 9, 2013

(54) DURATION ESTIMATION OF REPEATED DIRECTED GRAPH TRAVERSAL

(75) Inventors: Jay W. Benayon, Thornhill (CA); Curtis R. Miles, Markham (CA)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 11/971,042

(22) Filed: Jan. 8, 2008

(65) Prior Publication Data

US 2009/0177449 A1 Jul. 9, 2009

(51) Int. Cl.
G06F 7/60 (2006.01)
G06F 17/50 (2006.01)
G06F 9/45 (2006.01)
G06G 7/48 (2006.01)
G06G 7/62 (2006.01)

(52) U.S. Cl.
USPC ........... 703/2; 703/6; 703/17; 703/19; 703/22

(58) Field of Classification Search .................. 703/2, 6, 703/17, 19, 22
See application file for complete search history.

(56) References Cited

U.S. PATENT DOCUMENTS

| | | | |
|---|---|---|---|
| 5,058,033 A | | 10/1991 | Bonissone et al. |
| 5,937,388 A | * | 8/1999 | Davis et al. ........................ 705/8 |
| 5,974,538 A | * | 10/1999 | Wilmot, II .................... 712/218 |
| 6,038,538 A | * | 3/2000 | Agrawal et al. .................... 705/7 |
| 6,615,097 B2 | | 9/2003 | Ozaki |
| 7,076,474 B2 | * | 7/2006 | Jin et al. ........................... 706/45 |
| 2003/0046123 A1 | * | 3/2003 | Chen .................................. 705/7 |
| 2003/0233273 A1 | | 12/2003 | Jin et al. |

OTHER PUBLICATIONS

"Analysis on Service Level Agreement of Web Services" Jin, Machiraju, et al. Jun. 21, 2002.*
"A Scheme for Real-Time Channel Establishment in Wide-Area Networks", Ferrari. Apr. 1990.*
"Weighing and Integrating Evidence for Stochastic Simulation in Bayesian Networks", Fung, et al. Advanced Decision Systems. 1989.*
Jin, Li-Jie, et al; Business Process Simulation with HP Process Manager; HP Laboratories Palo Alto, HPL-2001-285, Nov. 7, 2001.

* cited by examiner

*Primary Examiner* — Omar Fernandez Rivas
*Assistant Examiner* — Nithya Janakiraman
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for duration estimation of simulating a process model embodied in a directed graph. In an embodiment of the invention, a method for estimating a duration of simulation for a process model embodied in a directed graph can include loading a directed graph for traversal in a simulation engine, identifying nodes in the directed graph, estimating a duration of simulation by the simulation engine for individual ones of the nodes, summing a duration of simulation for the individual ones of the nodes to produce an estimate of a duration of traversal of the directed graph, and presenting the estimate in association with the traversal of the directed graph by the simulation engine.

9 Claims, 1 Drawing Sheet

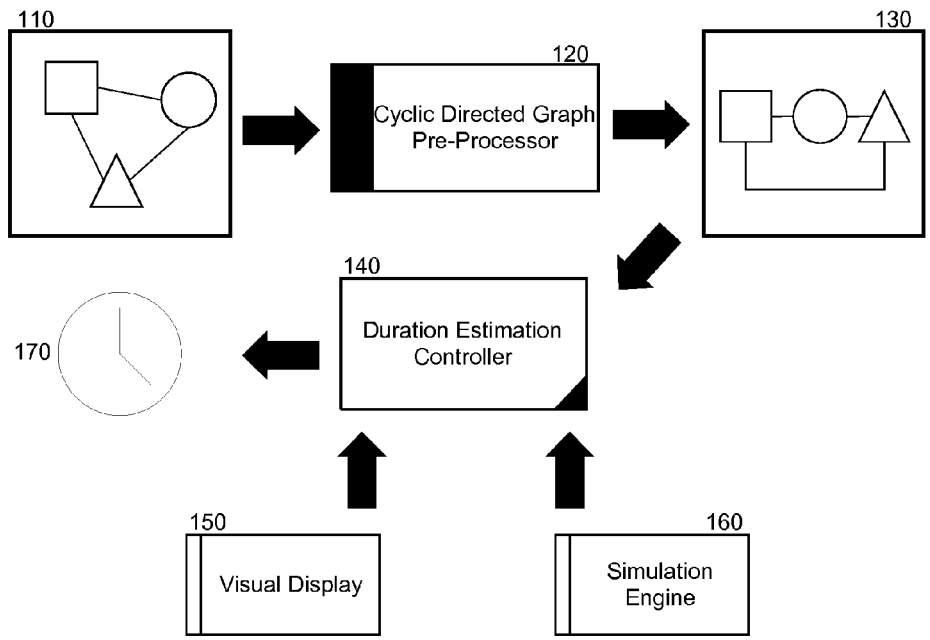
FIG. 1
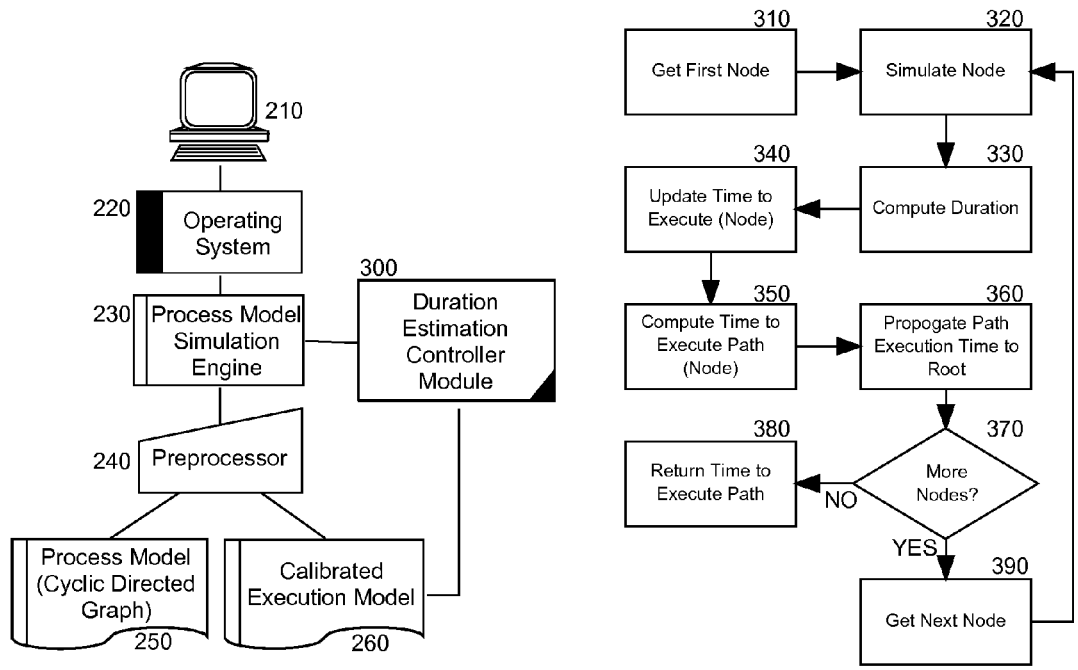
FIG. 2  FIG. 3

DURATION ESTIMATION OF REPEATED DIRECTED GRAPH TRAVERSAL

BACKGROUND OF THE INVENTION

1. Field of the Invention

The present invention relates to the field of directed graph traversal and more particularly to time estimation for traversing a directed graph.

2. Description of the Related Art

Process modeling and simulation relates to the modeling and simulation of dynamic or static systems, which can include, but are not limited to, enterprise management systems, engineering systems, networked information technology systems, utility systems, utility computing systems, autonomic computing systems, on-demand systems, electric power grids, biological systems, medical systems, weather systems, financial market systems, and business process systems. Such systems can be modeled and simulated for a variety of purposes including monitoring, analysis, control, design, simulation, and management.

A process model is an abstract description of a process such as a business process or any other process related to the lifecycle of a system. The abstract description of the process model can include sufficient detail required by a simulation engine for exercising the process model with one or more scenarios to determine a likely outcome. Process models generally specify one or more tasks or activities of a process and the relationship between the different tasks or activities. As part of the model, one or more events or conditions leading to the transition from one task or activity to the next can be specified. Models generally are expressed according to a specific format. Exemplary formats include Activity Decision Flow (ADF) Unified Modeling Language (UML) activity diagrams, and the Business Process Execution Language (BPEL), to name only a few.

Models are often expressed in the form of a directed graph. A directed graph is a graph whose edges are ordered pairs of vertices. That is, each edge can be followed from one vertex to another vertex. Directed graphs can be acyclic or cyclic. Cyclic directed graphs have at least one path that starts and ends at the same vertex. Acyclic directed graphs, in contrast, have no paths that start and end at the same vertex. In a directed graph, randomness can affect a path followed on any given traversal. For instance, decision points for respective vertices in a directed graph can result in different paths taken and for a cyclic directed graph, multiple iterations can occur though the number of iterations can vary from traversal to traversal depending upon the outcome at any given decision point in the directed graph.

At present, the execution time of a model can be simulated only through static time values assigned to each node in the model. Variability cannot be accommodated in consequence. To the extent that a model is expressed in the form of a directed graph, estimating execution time for the model can be highly dependent on the variable outcome of decision points in the model and the number of iterations transpiring in the course of the model execution. The very act of simulating a model, of course, also can consume time depending upon the processing resources consumed in the host computing environment. Accordingly, estimating the time remaining during the traversal of a directed graph can be an inexact science at best.

BRIEF SUMMARY OF THE INVENTION

Embodiments of the present invention address deficiencies of the art in respect to traversing a directed graph and provide a novel and non-obvious method, system and computer program product for duration estimation of simulating a process model embodied in a directed graph. In an embodiment of the invention, a method for estimating a duration of simulation for simulating a process model embodied in a directed graph can include loading a directed graph for traversal in a simulation engine, identifying nodes in the directed graph, estimating a duration of simulation by the simulation engine for individual ones of the nodes, summing a duration of simulation for the individual ones of the nodes to produce an estimate of a duration of traversal of the directed graph, and presenting the estimate in association with the traversal of the directed graph by the simulation engine.

In another embodiment of the invention, a simulation data processing system can be configured for estimating a duration of simulation for a process model embodied in a directed graph. The system can include a simulation engine configured to simulate nodes of a directed graph and a duration estimation controller configured to compute a duration of simulation by the simulation engine for a selected node in the directed graph, and to compute a running total of computed durations of simulation for a set of nodes in the directed graph. Finally, the system can include a pre-processor. The pre-processor can include program code enabled to explode all branched paths for all branched nodes of the directed graph, to determine a probability of simulation for each node in each exploded branched path, to compute a duration of simulation for nodes in the exploded branched path and to proportion the computed duration of simulation for each of the nodes by a corresponding probability of simulation, and to sum each computed duration of simulation for the nodes for the entire directed graph to produce an estimated duration of simulation for traversing the directed graph.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a block diagram illustrating a system for duration estimation of repeated directed graph traversal;

FIG. 2 is a schematic illustration of a simulation data processing system configured for duration estimation of repeated directed graph traversal; and, FIG. 3 is a flow chart illustrating a process for duration estimation of repeated directed graph traversal.

DETAILED DESCRIPTION OF THE INVENTION

Embodiments of the present invention provide a method, system and computer program product for duration estimation of repeated directed graph traversal. In accordance with an embodiment of the present invention, a cyclic directed graph can be pre-processed in a computing simulation environment to explode all branched paths for all branched nodes of the cyclic directed graph. Each node in the directed graph can be simulated in the simulation environment and timed during simulation to compute an estimated duration of execution. Additionally, a number of iterations can be estimated for each loop in the cyclic directed graph. Yet further, a probability can be determined for each exploded branched path and the duration of execution for all nodes in the exploded branched path can be proportioned accordingly. Finally, the different durations of execution can be summed for the entire cyclic directed graph to produce an estimated duration of execution for the cyclic directed graph.

In further illustration, FIG. 1 is a block diagram illustrating a system for duration estimation of repeated directed graph traversal. The system can include a cyclic directed graph pre-processor 120 configured to pre-process a cyclic directed graph 110 into an annotated exploded form 130. The annotated exploded form 130 can include an explosion of every path of the cyclic directed graph 110. Each node of the exploded form 130 can be annotated with an estimated execution time not only for the node, but also for an entire path emanating from the node. Yet further, the annotations for a node can include a number of iterations for executing the node. Finally, the annotations for a node can include a probability of the node executing in a given traversal of the graph.

A simulation engine 160 coupled to a visual display 150 can provide for the simulation of the nodes in the exploded form 130. The simulation of each of the nodes can be timed to determine an estimate to execute the node. A duration estimation controller 140 can coordinate the operation of the simulation engine 160 to process each node in the exploded form 130 and to provide updated values for each of the annotations for a node until the nodes of the exploded form 130 have been processed consistently with an estimate of a number of iterations for each node. As such, throughout the simulation, a duration estimate 170 can be provided in the visual display 150 representing an estimated duration of time required to traverse the cyclic directed graph 110.

The process described herein can be embodied specifically in a model simulation environment, though the process can be applied more generally to the traversal of a cyclic directed graph in any application. In illustration, FIG. 2 schematically depicts a simulation data processing system configured for duration estimation of repeated directed graph traversal. As shown in FIG. 2, a host computing platform (or multiple platforms in a distributed environment) 210 can support the execution of an operating system 220 hosting the operation of a business process model simulation engine 230.

A pre-processor 240 can be coupled to the process model simulation engine 230. The pre-processor 240 can include program code enabled to convert a raw process model 250 embodied within a cyclic directed graph into a calibrated execution model 260. The calibrated execution model 260 can include a re-organization of the raw process model 250, with additional attributes attached to each node, populated with initial values based upon calibration and graph analysis. The structure of the calibrated execution model 260 serves as a final internal representation of the business process represented by the raw process model 250 for the purpose of duration estimation, and its attribute values are constantly queried and updated in real-time throughout the simulation.

The structure of the calibrated execution model 260 can include an explosion of paths emerging from merge point nodes in the raw process model 250. Further, each node in the calibrated execution model 260 can be assigned four attributes, identified as follows:

$P_x$=the probability with which node x will be executed in each process instance, assuming no looping (i.e. no node in the calibrated execution model 260 is visited twice).

$T_x$=the estimated time required to simulate the execution of node x one time.

This value is initialized with the result of a calibration preprocessor step in which the raw process model 250 is simulated repeatedly according to a simplified simulation and the average duration of time consumed to execute a node in the process model 250 is recorded. The nodes are initially assigned the same value for T, but the value is refined on an individual node basis as the simulation is performed.

$N_x$=the estimated number of instances node x is expected to execute across all process instances.

$S_x$=the estimated time required to simulate the execution of node x and all downstream nodes emanating from node x across all remaining nodes of the process instances a through n. $S_x = N_x T_x + (S_a + S_b + \ldots + S_n)$, but excluding downstream nodes reached through looping from other downstream nodes.

The program code of the preprocessor 240 can account for loops in the raw process model 250 by estimating a number of iterations of a loop construct in the raw process model 250. The result of the loop iteration estimation process can be reflected in the Nx attribute of a given node x. Specifically, the program code of the preprocessor can identify a loop-final node for a loop construct in the raw process model 250. The loop-final node is the last node encountered in a loop construct in the calibrated execution model 260 before reaching a node that has already been visited, referred to as a loop-start node, when tracing a path through the calibrated execution model 260. Thereafter, the value of Nx can be computed for the loop-final node as the estimated number of loop iterations according to $N_x = [R/(1-P_x)] - R$, where R is the number of process repetitions during simulation and Px is the probability that node x will be executed in a given process instance. Finally, the current calculated value of Nx can be added to the existing running total value of Nx for node x. The final value of Nx for node x can be the sum of all loop iteration estimates for all loops in which node x is a participant.

A duration estimation controller module 300 also can be coupled to the process model simulation engine 230. The duration estimation controller module 300 can perform data collection and attribute tuning during simulation of the calibrated execution model 260. When a new process instance is created during simulation, the duration estimation controller module 300 can initialize a pointer that tracks the node of the calibrated execution model 260 contemporaneously under simulation in the process instance. As notifications are delivered to the calibrated execution model 260 indicating that tasks represented by nodes have started and finished within the process instance, the pointer can be updated accordingly. The pointer in turn can be used to identify the appropriate node in the calibrated execution model 260 to update attributes during simulation.

The operation of the duration estimation controller module 300 is shown by way of the flow chart of FIG. 3 illustrating a process for duration estimation of repeated directed graph traversal. Beginning in block 310, a first node in the process instance can be selected for processing and in block 320, the node can be simulated. In block 330, a duration of execution can be computed for the simulation of the task by comparing a start time and a completion time. Thereafter, in block 340 the time value of execution for the node can be updated by adding the computed duration of execution to a running total based upon the duration of execution computed for the simulation of the other nodes in the process instance.

In block 350, the time to execute the entire path of downstream nodes emanating from the selected node can be computed and, in block 360, the path execution time can be propagated to each upstream node to the root node of the process instance. Subsequently, in decision block 370, if additional nodes remain to be processed in the process instance, in block 390 a next node in the process instance can be selected for simulation and the duration estimation process of FIG. 3 can be repeated through block 320. When no further nodes remain to be simulated in decision block 370, in block 380 the execution time for the entire process instance can be provided in a display of an estimated duration of execution for the business process model represented by the process instance.

Embodiments of the invention can take the form of an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for estimating a duration of simulating a process embodied in a directed graph comprising:
   loading a directed graph for traversal in a simulation engine including a hardware processor;
   exploding all branched paths for all branched nodes emerging from merge point nodes of the directed graph;
   identifying a plurality of nodes in the directed graph;
   determining a probability of simulation for each node in each exploded branched path;
   estimating a duration of simulation by the simulation engine for individual ones of the nodes in the exploded branched path;
   proportioning the estimated duration of simulation for each of the nodes in the exploded branched path by a corresponding probability of simulation;
   summing the estimated duration of simulation for the individual ones of the nodes
   presenting the produced estimate;
   identifying a plurality of loops of the nodes in the directed graph;
   estimating a number of iterations for each of the loops by computing Nx for node x in a loop and for each loop according to the equation $N_x=[R/(1-P_x)]-R$, where R is a number of repetitions for traversing the directed graph and where $P_x$ is a probability that a traversal of the directed graph includes node x in a given repetition, and adding the computed Nx to an existing running total value for Nx in node x; and,
   summing the duration of simulation for each of the number of iterations associated with the individual ones of the nodes to produce the estimate of the duration of traversal of the directed graph.

2. The method of claim 1, wherein
the directed graph embodies a business process model.

3. The method of claim 1, wherein
estimating a duration of simulation by the simulation engine for individual ones of the nodes in the exploded branched path, comprises computing a running average for a duration of simulation for each individual one of the nodes when simulating each individual one of the nodes.

4. The method of claim 1, wherein
summing the estimated duration of simulation for the individual ones of the nodes, comprises:
   for each node in the directed graph, computing a duration of simulation for the node and for each downstream node emanating there from;
   summing the computed duration of simulation for the node and for each downstream node emanating therefrom; and,
   propagating the summed computed duration of simulation to a root node in the directed graph.

5. A simulation data processing system configured for estimating a duration of simulating a process embodied in a directed graph, the system comprising:
   a processor configured to include
      a simulation engine configured to simulate nodes of a directed graph;
      a duration estimation controller configured to
         compute a duration of simulation by the simulation engine for a node in the directed graph, and
         compute a running total of computed durations of simulation for a set of nodes in the directed graph; and
      a pre-processor comprising program code enabled to
         explode all branched paths for all branched nodes emerging from merge point nodes of the directed graph,
         determine a probability of simulation for each node in each exploded branched path,
         compute a duration of simulation for nodes in the exploded branched path,
         proportion the computed duration of simulation for each of the nodes in the exploded branched path by a corresponding probability of simulation, sum each computed duration of simulation for the nodes, identify a plurality of loops of the nodes in the directed graph, estimate a number of iterations for each of the loops by computing Nx for node x in a loop and for each loop according to the equation $Nx=[R/(1-Px)]-R$, where R is a number of repetitions for traversing the directed graph and where Px is a probability that a traversal of the directed graph includes node x in a given repetition, and adding the computed Nx to an existing running total value for Nx in node x, and, sum the duration of simulation for each of the number of iterations associated with the individual ones of the nodes to produce the estimate of the duration of traversal of the directed graph.

6. A computer program product comprising a non-transitory computer usable storage medium having stored therein computer usable program code for estimating a duration of simulation of a process embodied in a directed graph, the computer usable program code, which when executed by a computer hardware system, causes the computer hardware system to perform:

loading the directed graph for traversal in a simulation engine;

exploding all branched paths for all branched nodes emerging from merge point nodes of the directed graph;

identifying a plurality of nodes in the directed graph;

determining a probability of simulation for each node in each exploded branched path;

estimating a duration of simulation by the simulation engine for individual ones of the nodes in the exploded branched path;

proportioning the estimated duration of simulation for each of the nodes in the exploded branched path by a corresponding probability of simulation;

summing the estimated duration of simulation for the individual ones of the nodes;

presenting the produced estimate;

identifying a plurality of loops of the nodes in the directed graph;

estimating a number of iterations for each of the loops by computing Nx for node x in a loop and for each loop according to the equation $Nx=[R/(1-Px)]-R$, where R is a number of repetitions for traversing the directed graph and where Px is a probability that a traversal of the directed graph includes node x in a given repetition, and adding the computed Nx to an existing running total value for Nx in node x; and, summing the duration of simulation for each of the number of iterations associated with the individual ones of the nodes to produce the estimate of the duration of traversal of the directed graph.

7. The computer program product of claim 6, wherein the directed graph is a cyclic directed graph embodying a business process model.

8. The computer program product of claim 6, wherein the estimating the duration of simulation comprises computing a running average for a duration of simulation for each individual one of the nodes when simulating each individual one of the nodes.

9. The computer program product of claim 8, wherein the summing the estimated duration of simulation comprises:

computing for each node in the directed graph a duration of simulation for the node and for each downstream node emanating there from;

summing the computed duration of simulation for the node and for each downstream node emanating therefrom; and propagating the summed computed duration of simulation to a root node in the directed graph.

* * * * *